(12) United States Patent
Chebrolu

(10) Patent No.: US 6,868,445 B1
(45) Date of Patent: Mar. 15, 2005

(54) LOW-IMPACT METHOD AND APPARATUS FOR MAINTAINING NETWORK ACCESS SERVERS

(75) Inventor: Prasad Y. Chebrolu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/431,357

(22) Filed: Nov. 1, 1999

(51) Int. Cl.[7] ............................................. G06F 15/173
(52) U.S. Cl. .................... 709/224; 709/225; 379/32.04
(58) Field of Search ................. 709/217–218, 709/223–225, 249; 370/242, 244, 250; 714/4, 13, 39, 47; 379/15.01, 32.01, 32.04, 93.14, 137–138, 190–193

(56) References Cited

U.S. PATENT DOCUMENTS

| | | | | | |
|---|---|---|---|---|---|
| 4,629,832 | A | * | 12/1986 | Carson et al. | 379/207 |
| 5,438,614 | A | * | 8/1995 | Rozman et al. | 379/93.08 |
| 5,933,490 | A | * | 8/1999 | White et al. | 379/221.01 |
| 6,587,433 | B1 | * | 7/2003 | Borella et al. | 370/230 |
| 6,606,298 | B1 | * | 8/2003 | Foltak | 370/216 |
| 6,636,519 | B1 | * | 10/2003 | Walsh et al. | 370/401 |

OTHER PUBLICATIONS

Hasler, J., Re: How to Establish a Semi–Permanent Dial–Up Connection?, lists.debian.org/debian–user/1998/debian–user–199812/msg03897.html, pp. 1–2, Dec. 31, 1998.*

Service Provider Dial Scenarios and Configurations, www.cisco.com/univercd/cc/td/doc/product/software/ios113ed/113ed_cr/dial_c/dcprt0/dcspex.pdf, pp. DC–13 to DC–56, Jan. 1998.*

Fratto, M., Accessing the Enterprise: Large–Scale RAS to the Rescue, Network Computing, pp 1–8, Apr., 1999.*

Fratto, M., More than Throughput: Managed Modern Chassis, Network Computing, vol. 7, No. 17, pp. 1–5, Nov. 1996.*

* cited by examiner

*Primary Examiner*—Larry D. Donaghue
(74) *Attorney, Agent, or Firm*—Johnson & McCollom, P.C.

(57) ABSTRACT

A method of performing maintenance on a network access server having associated channels carrying incoming digital or analog traffic determines whether maintenance is needed on a network access server and then communicating a busy condition of any unused associated channel from the network access server to the service request switch. Used channels are monitored for existing calls and when the used channel becomes substantially unused as indicated by defined digital and analog signaling protocol a busy condition is communicated from the network access server to the service request switch. An unused channel may be determined by usage falling below a predetermined threshold. Any remaining, existing calls are migrated to other network access servers. A signal is then sent to indicate that maintenance on the network access server can be performed and any new request arriving during a busy condition of the network access server are routed to another network access server.

16 Claims, 2 Drawing Sheets

LOW-IMPACT METHOD AND APPARATUS FOR MAINTAINING NETWORK ACCESS SERVERS

BACKGROUND OF THE INVENTION

Networks sometimes require software and/or hardware maintenance, e.g. component or module repair, replacement or upgrade, to their access servers. This generally requires reloading software, which means taking one or more disk drives off-line, etc. It often requires power cycling, which does the same thing. Because one or more users/clients are almost always connected to the access servers, reloading or power cycling the access servers to perform the upgrade denies service to the connected users/clients. For the same reason, service personnel are required to schedule such upgrades during inconvenient, off-peak hours, to minimize the number of connected users who are affected.

SUMMARY OF THE INVENTION

The disclosed method and apparatus are for performing maintenance on a network access server having associated channels, the network access server being operatively coupled with a service request router, e.g. a telephone company (telco) switch. The method includes first determining whether off-line maintenance is needed on a network access server and if so then communicating a busy condition of any associated channel from the network access server to the telco switch. The method further includes monitoring any used associated channel until the used associated channel becomes unused. Thereafter, maintenance may be performed on the network access server. After completion of the maintenance, the method includes communicating an idle condition of any associated channel to the telco switch. For the duration of the maintenance on the given access server, new client service requests that may arrive during a busy condition of the network access server are auto-routed to another network access server operatively coupled with the telco switch.

The apparatus includes a maintenance scheduler for scheduling off-line maintenance for a given network access server. It further includes a channel usage monitor responsive to the scheduler for monitoring usage of the associated channels of the given network access server. Finally, a make-busy mechanism is provided that is responsive to the channel usage monitor and coupled with the telco switch. The make-busy mechanism signals the telco switch that all channels are busy, whereby maintenance is performed on the given network access server after the signaling and upon a determination by said channel usage monitor that no channel is currently in use. There is thus no discernible impact of maintenance on current or future users/clients, and maintenance may be scheduled even during peak use hours of operation of the network.

DETAILED DESCRIPTION OF THE INVENTION

Figure 1:
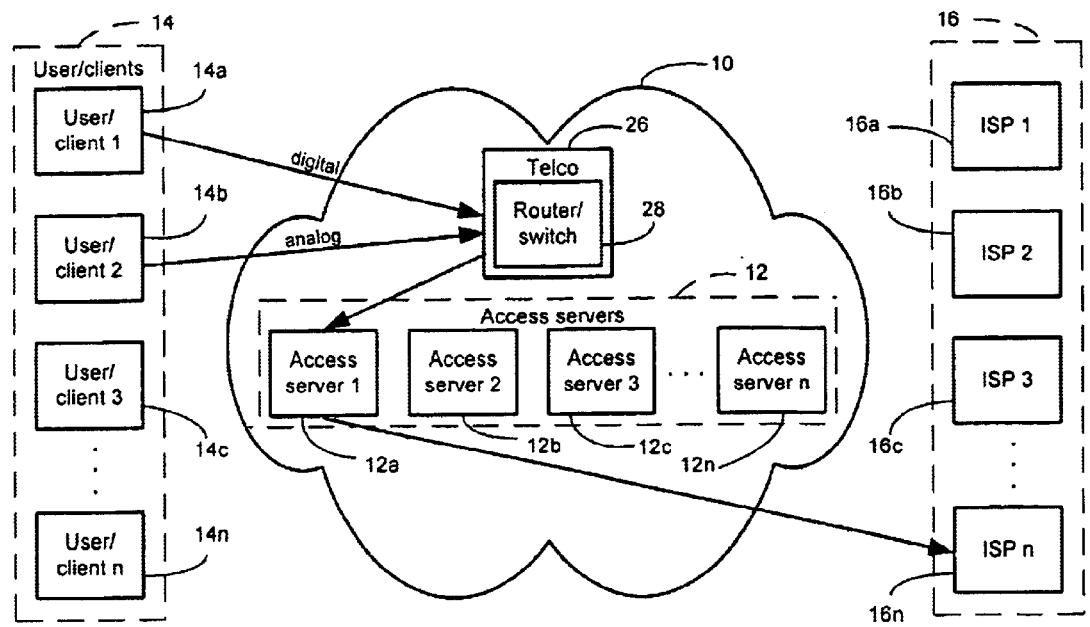
FIG. 1 is a system block diagram illustrating a network in which the method and apparatus in accordance with the invention is used.
Figure 2:
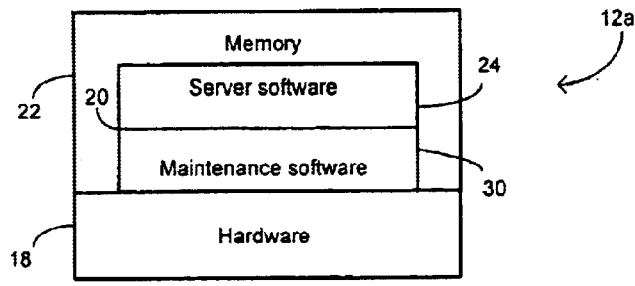
FIG. 2 is a block diagram of the access server of FIG. 1, designed in accordance with the invention.

FIGS. 1 and 2 illustrate a network 10 having one or more access servers 12 providing connections between one or more users/clients 14 and one or more Internet service providers (ISPs) 16. One such access server 12a will be referred to herein as a given access server that may require service or maintenance, e.g. a hardware repair or replacement or a software upgrade or rebuild. Those of skill in the art will appreciate that given access server means any access server requiring maintenance. Accordingly, given access server 12a is merely illustrative of one such access server requiring maintenance, of which there may be many. Maintenance may be performed on any and all access servers within network 10, within the spirit and scope of the invention.

It may be seen from FIG. 2 that access servers such as access server 12a typically include computer hardware 18 executing application-specific software 20 that provides traditional access server functions to users/clients 14 and ISPs 16. Software 20 resides in memory 22, which typically includes a combination of random-access memory (RAM), nonvolatile storage such as a disc drive or a combination thereof, e.g. a memory configured as a cache. Periodically, software 20 including traditional access server software 24 requires maintenance, e.g. upgrading to a later revision to enhance server performance or to fix software bugs or to add new server features.

Referring specifically to FIG. 1, access servers 12 will be understood to be arranged in banks, or so-called hunt groups, with each bank or group being connected to a telephone company (Telco) 26 by a switch 28 typically owned and operated by telco 26. Switch 28 may also be referred to herein as a service request switch, as it performs an essentially switching function by answering a telephone call and allocating one or more network channels between a user/client and one or more ISPs. Each hunt group will be understood to correspond with a single telephone number, as is typical. Service request or telco switch 28 answers incoming calls to that telephone number and connects one or more users/clients 14 with one or more requested ISPs 16 by allocating plural channels within one of the access servers 12 within the hunt group.

Service request switches (like telco switch 28 of FIG. 1) and access servers 12 will be understood to have a defined protocol for communicating service requests from switch 28 to access server 12 and for communicating channel or timeslot availability from access servers 12 to switch 28. FIG. 1 shows a typical service request sent by given user/client 14a to telco 26. The request is routed by switch 28 to a given access server 12a having one or more available channels. The service request is fulfilled by access server 12a connecting user/client 14a to one or more ISPs such as ISP 16n. These access and control paths are indicated in FIG. 1 by bold lines having arrows. Typically, thousands of such requests concurrently are routed and fulfilled through network 10, with one or more users/clients 14a, 14b, 14c, . . . 14n being connected via one of more switches such as switch 28 and access servers 12a, 12b, 12c, . . . 12n with one or more ISPs 16a, 16b, 16c, . . . 16n.

Referring now to FIGS. 1 and 2, hardware or software maintenance on given access server 12a may be necessary from time to time. Minor software upgrades such as bug fixes may be accomplished by installing software 'patches' without taking given access server 12a offline, i.e. without impact on users/clients 14 or ISPs 16. Hardware repairs and major software upgrades require powering down workstation 20, e.g. to replace a crashed disc drive, to install upgraded software modules and to rebuild the disc files. When an access server is powered down or otherwise taken offline, e.g. when it is momentarily halted or 'power cycled', the access server cannot perform its normal functions. Accordingly, users/clients 14 and ISPs 16 are significantly impacted by complete service interruption, however quick the upgrade and however brief the interruption. Unfortunately, major upgrades may take many minutes or even a few hours, which represents a significant downtime for connected users/clients and ISPs.

Those of skill in the art know that the nature of network 10 is that there are typically plural ones of such access servers 12 performing the same services of fulfilling requests by the users/clients for access to the ISPs. Hence, when a given access server 12a is offline, nevertheless other access servers 12 capable of performing the same functions are fully operational within network 10.

In accordance with the invention, apparatus 30 takes the form of software resident and operational in one or more access servers 12 such as given access server 12a. Those skilled in the art will appreciate that, within the spirit and scope of the invention, firmware or hardware alternatives are contemplated. Those skilled in the art also will appreciate that the structural and functional elements as described and illustrated herein may be differently partitioned or distributed across network 10 in any suitable way. For example, special software, firmware or hardware resident in switch 28 and apparatus 30 may implement the communication protocol by which switch 28 routes user/client service requests to alternative network access servers while a given access server is upgraded or repaired. Apparatus 30 is shown in FIG. 2 as maintenance software that is apart of software 20 residing in memory 22. As such, apparatus 30 itself may be serviced or maintained in accordance with the invention.

Apparatus 30 preferably minimizes, and, most preferably, eliminates, any negative impact on users/clients 14 when given access server 12a is taken out of service. When maintenance is needed, apparatus 30 forces a smooth transition, or migration, of presently connected users/clients from given access server 12 to another capable access server within network 10 and preferably within the same hunt group. Thus, there is little or no apparent service disruption to the connected users/clients of ISPs. Moreover, given access server 12a can be upgraded at the convenience of service personnel, even during peak demand. Meanwhile, new requests for service are automatically routed by switch 28 to alternative access servers 12. Preferably, in accordance with the invention, this migration of current users/clients and new clients is to alternative access servers that are within the same 'hunt' group as is given access server 12a.

Apparatus 30 forces such a migration away from given access server 12a by 'busying out' all of its channels, thereby 'seizing' them away from switch 28 temporarily for maintenance purposes. Switch 28 recognizes given access server 12a as being busy and alternatively routes calls around the busy access server. Those of skill in the art will appreciate that the given access server so indicates its busy status to switch 28 preferably in accordance with the existing protocols by which switch 28 allocates access servers 12 to users/clients 14. Thus, the next time a user/client service request is received by switch 28, it is routed to an alternative one of access servers 12. As soon as most or preferably all existing users/clients 14 of given access server 12a have terminated their network sessions, access server 12a is in fact substantially idle, yet appears to switch 28 to be busy.

At this time, access server 12a can be power cycled or otherwise halted for maintenance. Upon completion of maintenance, access server 12a changes its busy status to indicate that it is no longer busy and switch 28 thereafter assigns service requests to upgraded access server 12a as with all other access servers 12 within the hunt group.

Importantly, clients/users 14 are at most only minimally impacted by access server 12a effectively taking itself 'offline' with respect to switch 28. Each client/user 14 that was connected to access server 12a, when scheduled maintenance began, most preferably has terminated its own network session. Each user/client 14 has done so on its own initiative, rather than having the session abruptly and disruptively terminated by network 10 for access server maintenance. All new clients/users 14 requesting service through switch 28 have been accommodated by connection with another access server within the same hunt group. Moreover, maintenance of access server 12a without impact on users/clients has been accomplished within the confines of the large installed base represented by the established telco switching mechanism. Thus, there is no impact on the design or operation of telco 26 or switch 28. Finally, because more access servers are provided in a typical network than are needed to meet peak demand, there is no appreciable impact on the performance and responsiveness of network 10 as a whole.

Those of skill in the art will appreciate that one or more current users/clients 14a, 14b, 14c, . . . 14n may be using access server 12a at a low usage rate below a predetermined threshold. It also will be appreciated that one or more current users/clients 14a, 14b, 14c, . . . 14n may be connected to an ISP for seemingly interminably long sessions. Either situation creates a risk that needed maintenance of given access server 12a will be unnecessarily delayed. Thus, it is contemplated that such use will be deemed insubstantial, i.e. the channel(s) of given access server 12a may be deemed by apparatus 30 in accordance with the invention to be substantially unused or substantially idle. After a predetermined period of time, such user/clients may be disconnected by scheduling maintenance despite their lingering use of given access server 12a.

FIG. 1 indicates one such group of access servers 12b, 12c, . . . 12n within a dashed outline embracing given access server 12a in need of maintenance. Migrating one or more users/clients 14 from given access server 12a to another one or more of plural alternative access servers 12b, 12c, . . . 12n within the same hunt group maintains the same user interface and service level for the migrated users/clients 14 as they realized before the migration. In accordance with the invention, the migration is substantially transparent to the migrated users/clients and to their connected ISPs. In other words, there is little or most preferably no downtime whatsoever from the customer perspective. Moreover, access server maintenance may be scheduled any time of the day, even during hours of peak use of network 10.

Figure 3:
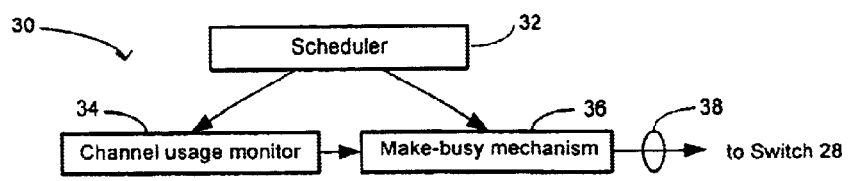
FIG. 3 is a detailed block diagram of the access server maintenance apparatus in accordance with the invention.

FIG. 3 shows preferably low-impact, or most preferably no-impact, access server maintenance apparatus 30 in more detail. Apparatus 30 preferably includes a maintenance scheduler 32, a channel usage monitor 34 and a busy-out, or make-busy, mechanism 36 coupled with switch 28 of telco 26. Scheduler 32 very simply responds to a manual or scripted maintenance request respecting given access server 12a by determining whether such maintenance will require power cycling or otherwise halting access server 12a. If such maintenance would take access server 12a offline, then scheduler 32 signals usage monitor 34 to begin monitoring channel usage. Preferably concurrently, scheduler 32 signals make-busy mechanism 36 immediately to make any presently unused channels 'busy' by signaling their busy condition to switch 28. Monitor 34 meanwhile scans all channels to identify unused channels and signals make-busy mechanism 36 to flag additional unused channels as each once-used channel becomes idle. Make-busy mechanism 36 in response to the signal from channel usage monitor 34 then signals switch 28 that such additional unused channels are in use.

Make-busy mechanism 36 signals the busy condition of all channels within its purview preferably via an established interface protocol 38. In other words, such signaling of channel busy status is performed preferably in accordance with existing protocols. For example, all of the available channels and timeslots on the high-speed T1/T3 Internet trunks may be busied out—whether the trunks are of the channel-associated signaling (CAS) or primary rate interface (PRI) type or of some other type related to trunk infrastructure within a network. Moreover, existing switch protocols compatible with telco practices preferably are used, whether they be in-channel signaling protocols such as CAS or dedicated-channel signaling protocols such as PRI, or other protocols defined for existing or future trunks and network infrastructures. Broadly stated then, the signaling function of apparatus 30, performed by make-busy mechanism 36 described and illustrated herein, is in accordance with predefined network software, firmware and hardware infrastructures.

Make-busy mechanism 36 preferably sets a busy flag per unused channel within interface 38, thereby to preclude unused channel allocation by switch 28 during the maintenance setup sequence. The busy flags set by make-busy mechanism 36 will be understood intentionally to misrepresent to switch 28 that the corresponding unused channels are in use. The flag may be defined by one or more bits within a field defined within an interface 38 protocol existing between make-busy mechanism 36 and switch 28 to which it is operatively coupled. By using existing interface protocol 38 between given access server 12a and switch 28, the invention is entirely compatible with existing switches and no special protocol or interface modifications are needed. The busy flags, when set or cleared by make busy mechanism 36, may be thought of as mock busy signals that force switch 28 to act in accordance with a preexisting protocol to avoid allocation of such channels to otherwise normal service requests. This mechanism buys time for given access server 12a to perform any required off-line service, e.g. hardware or software maintenance, reconfiguration or upgrade.

This busy flag indication, or signal, from apparatus 30 to switch 28 indicates that such channels are in use and thus are treated by switch 28 as not being available for allocation to new users/clients 14. In accordance with the invention, it is the same busy flag or signal that under normal conditions is used by switch 28 to determine whether a new client request may be assigned a particular one of access servers 12. Use by apparatus 30 of the busy flag to fend off further channel allocation by switch 28 thus makes it possible—without modification of the installed base of switches such as switch 28—to accomplish orderly, low-impact maintenance of access server hardware and software.

Meanwhile, monitor 34 continues to monitor those channels that were in use when scheduler 32 invoked a maintenance sequence. As each user/client 14 logs off or otherwise terminates the network session, monitor 34 signals make-busy mechanism 36, which in turn signals switch 28 via interface 38, by setting the busy flag for the now-idle channel. When all channels within given access server 12a are idle, and all are reported to switch 28 as being busy, offline maintenance may commence.

Switch 28 responds in the normal way to the apparent busy condition of all channels of given access server 12a by routing further access requests to alternative access servers. Preferably, such rerouting of access service requests is to one or more of the other access servers 12b, 12c, . . . 12n that are within the same hunt group as access server 12a. Those of skill in the art will appreciate that switch 28 routes new service requests to another access server based upon the other access server's channel availability as represented by its own channel busy signaling scheme.

Thus, apparatus 30 via maintenance scheduler 32, channel usage monitor 34 and make-busy mechanism 36 effectively takes given access server 12a temporarily offline for service. Apparatus 30 forces a busy status indication to be communicated to switch 28 via interface 38 from the commencement of the maintenance setup sequence through the duration of the required maintenance. When maintenance is completed, apparatus 30 makes-ready its associated access server 12a. Apparatus 30 accomplishes this by updating interface 38 to signal the idle condition of all channels, thereby communicating its readiness to switch 28 to serve further users/clients 14. Again, such ready signaling preferably is in keeping with the existing protocol between access servers and their host telco switch.

Apparatus 30 within given access server 12a—operatively coupled with switch 28—effectively forces a temporary and orderly migration of one or more users/clients 14a, 14b, 14c, . . . 14n to another access server 12b, 12c, . . . 12n. Switch 28 will be understood to respond in accordance with its normal operation, without modification to its hardware, firmware or software. The standard interface over which the busy and idle conditions of given access server 12a is communicated is illustrated in FIG. 2 as logical interface 38.

Those of skill in the art will appreciate that, within the spirit and scope of the invention, apparatus 30 may take many different forms. For example, the functional blocks shown in FIG. 2 as scheduler 32, channel usage monitor 34 and make-busy mechanism 36 may be combined into a signal functional software, firmware or hardware module that signals switch 28 in accordance with existing or new channel busy/idle signaling configurations. Those of skill in the art also will appreciate that scheduler 32 may be apart of network system administration software, which in turn may be a part of the access server operating system (OS), which in turn may be a part of the ISP software. Accordingly, the logical segmentation and distribution of the software, firmware or hardware described herein may vary, as may the physical residence of its component parts, all within the spirit and scope of the invention.

Figure 4:
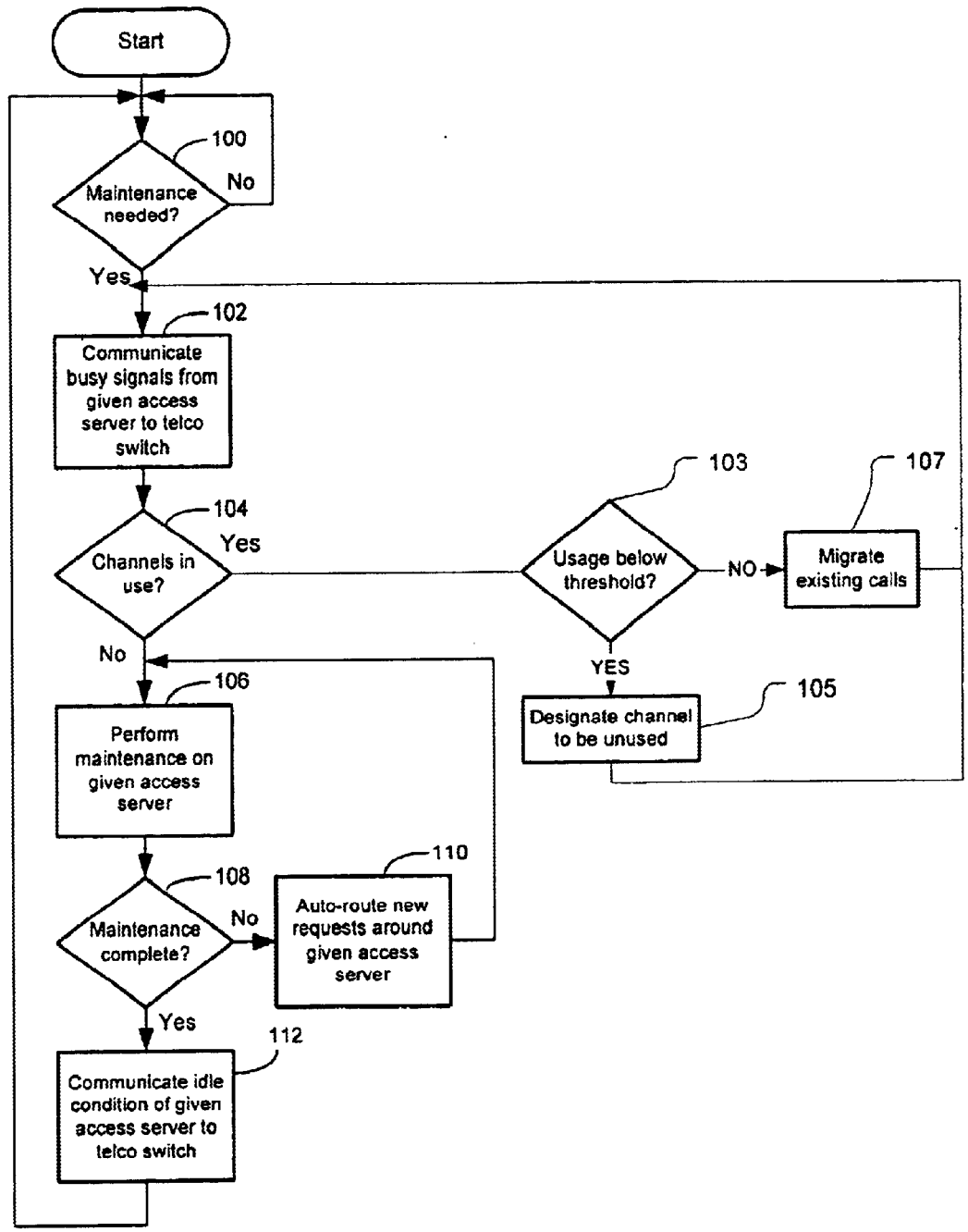
FIG. 4 is a flow chart of the access server maintenance method in accordance with the invention.

FIG. 4 illustrates the low-impact network access server maintenance method in accordance with the invention. The method includes starting the operation of apparatus 30 and determining at 100 whether maintenance is needed with respect to given access server 12a. Those of skill will appreciate that the determination that maintenance is needed may rely on a command from a system administrator. The command may come from a person, i.e. maintenance may be initiated manually, when desired, by maintenance or software systems personnel, or it may be come from a software utility, i.e. maintenance may be initiated automatically by a network or access server maintenance program executing a predefined script. The initiator of a maintenance sequence in accordance with the invention will be referred to herein simply as a scheduler, which will be understood to refer to either a human or computer mechanism for scheduling maintenance on a given access server.

When it is determined that maintenance is needed, a busy signal representing the make-busy condition of each unused channel of given access server 12a is communicated at 102 to router or switch 28. At 104, it is determined whether channels that may have been in use when maintenance was invoked are now no longer in use. If the channel is still in use, it is determined at 103 if the usage falls below a predetermined threshold due to lingering access, as discussed above. If the usage falls below a predetermined threshold, the calls a disconnected at 105. If the usage has not fallen below a predetermined threshold, the calls are migrated to other network access servers at 107.

As described above, interface 38 is updated continuously to signal switch 28 the progressively 'busy' condition of the channels. In other words, blocks 104, 102 represent awaiting termination of use of any remaining associated channels of the given access server and communicates a busy condition thereof to the service request router. When all channels of given access server 12a are idle, and have been made-busy by communicating their busy condition to router or switch 28, maintenance is performed at 106.

During maintenance of given access server 12a, router or switch 28 automatically routes service requests to other access servers 12b, 12c, . . . 12n. as indicated in FIG. 3 at 108. This auto-routing of requests around given access server 12a fulfills the network connection expectations of users/clients and ISPs. When maintenance is complete, as determined at 110, given access server 12a communicates the idle condition of all channels to switch 28. Thereafter, given access server 12a resumes normal access service until the next scheduled maintenance. That is, given access server 12a is back on line from the perspective of switch 28, which continues to allocate its channels to new requests from one or more users/clients 14a, 14b, 14c, . . . 14n for connection with one or more ISPs 16a, 16b, 16c, . . . 16n. Those of skill in the art will appreciate that apparatus 30 may be installed in each and every one of access servers 12 within network 10, such that all access servers may be similarly maintained without adverse impact on customers or service personnel.

Accordingly, in accordance with the invention, users/clients already connected to the access server that requires upgrading are progressively disconnected, without service level degradation or interruption. New users/clients are connected to alternative access servers preferably within the same hunt group, also without service level degradation or interruption. Moreover, existing network OS, ISP and telco switch software and hardware installations require no modification whatsoever, as the invented apparatus and method operate transparently with respect to existing network infrastructures and request servicing protocols. Finally, access server maintenance may be scheduled during normal business hours, despite peak use at those times of day, for the convenience of service personnel.

Having illustrated and described the principles of my invention in a preferred embodiment thereof, it should be readily apparent to those skilled the art that the invention can be modified in arrangement and detail without departing from such principles. I claim all modifications coming within the spirit and scope of the accompanying claims.

What is claimed is:

1. A method of performing maintenance on a network access server having associated channels carrying incoming digital or analog traffic, the network access server being operatively coupled with a service request switch, the method comprising:

determining whether off-line maintenance is needed on a network access server and if so then communicating a busy condition of any unused associated channel from the network access server to the service request switch;

monitoring any used associated channel for either of a digital and an analog call thereon and waiting until the used associated channel becomes substantially unused as indicated by defined digital and analog signaling protocols comprehended by said monitoring, and migrating any existing calls to other network access servers without disconnection to the end user;

when the used associated channel becomes substantially unused as indicated by such defined digital and analog signaling protocols comprehended by said monitoring, communicating a busy condition of such then-unused channel from the network access server to the service request switch;

signaling that maintenance on the network access server can be performed; and automatically routing any new client service requests that may arrive during a busy condition of the network access server to another network access server operatively coupled with the service request switch.

2. The method of claim 1 which after completion of the maintenance further comprises communicating an idle condition of any associated channel to the service request switch.

3. The method of claim 2 wherein said communicating is performed via a standard communication protocol between the network access server and the service request switch, the standard protocol normally communicating the busy/idle condition of any associated channel of the network access server to the service request switch.

4. The method of claim 1 in which the network access server is within a given hunt group, wherein said automatic routing is targeted to another network access server within the given hunt group.

5. Apparatus for performing maintenance on a given network access server within a given hunt group, the network access server being operatively coupled with a telephone company (telco) switch, the apparatus comprising:

a scheduler for automatically scheduling off-line maintenance for a given network access server upon the occurrence of one or more of a predetermined condition and a predetermined time;

a channel usage monitor responsive to said scheduler for monitoring usage of the associated channels of the given network access server and for determining if existing calls are below a predetermined usage threshold, wherein existing calls below the usage threshold will be migrated to other network access servers;

a make-busy mechanism responsive to said channel usage monitor and coupled with the telco switch for signaling the telco switch that all channels are busy, whereby maintenance is performed on the given network access server after said signaling and upon a determination by said channel usage monitor that no channel is currently in use; and automatically routing any new client service requests that may arrive during a busy condition of the network access server to another network access server operatively coupled with the service request switch and within the given hunt group.

6. The apparatus of claim 5, wherein the signaling by said make-busy mechanism is performed via a standard communication protocol between the network access server and the telco switch, the standard protocol normally communicating a busy/idle condition of any associated channel of the network access server to the telco switch.

7. The apparatus of claim 5, wherein the signaling by said make-busy mechanism in accordance with predefined network software, firmware and hardware infrastructures.

8. A method of temporarily taking offline for service a given network access server within a given hunt group, the given network access server having plural associated channels that may carry digital or analog calls, the network access server being operatively coupled with a network service request switch, the method comprising:

busying out any unused channels of the given access server and communicating a busy condition thereof to the service request switch;

monitoring any used associated channel for either of a digital and an analog call thereon;

during said monitoring, awaiting substantial non-use of any remaining associated channels of the given access server and thereafter communicating a busy condition thereof to the service request switch, such substantial non-use being indicated by usage falling below a predetermined usage threshold, wherein remaining, existing calls may be migrated to other network access servers prior to communicating a busy condition;

signaling that service to the given access server can be performed; and routing any new client service requests that may arrive during a busy condition of the given network access server to another network access server operatively coupled with the service request switch and within the given hunt group; and after such service is completed communicating a substantially idle condition of the associated channels to the service request switch.

9. The method of claim 8 which further comprises scheduling the service automatically by command to the given access server.

10. The method of claim 8 which further comprises scheduling the service manually by command to the given access server.

11. The method of claim 8 which further comprises scheduling the service automatically by command to the given access server from a system administrator software program residing within the network.

12. A computer-readable medium containing a program for taking an active network access server, within a given hunt group, offline for maintenance, the active network access server being operatively coupled with a telephone company (telco) switch, the program comprising:

a maintenance scheduler for automatically scheduling off-line maintenance for the active network access server;

a channel usage monitor responsive to said scheduler for monitoring usage of the associated channels or the active network access server, and for migrating existing calls below a usage threshold to other network access servers;

a make-busy mechanism responsive to said scheduler and to said channel usage monitor and coupled with the telco switch for signaling the telco switch that all channels associated with the active network access server are busy, whereby maintenance is performed on the active network access server after such signaling and upon a determination by said channel usage monitor that no channel associated with the active network access server is currently in use; and automatically routing any new client service requests that may arrive during a busy condition of the active network access server to another network access server operatively coupled with the service request switch and within the given hunt group.

13. The program of claim 12 wherein such signaling by said make-busy mechanism is performed via a standard communication protocol between the active network access server and the telco switch, the standard protocol normally communicating a busy/idle condition of any associated channel of the active network access server to the telco switch.

14. The program of claim 12 wherein the signaling by said make-busy mechanism is in accordance with predefined network software, firmware and hardware infrastructures.

15. A computer-readable medium containing a program for performing maintenance on a network access server within a given hunt group, the network access server having associated channels, the network access server being operatively coupled with a service request switch, the program comprising:

instructions determining whether off-line maintenance is needed on the network access server;

instructions communicating a busy condition of any associated channel from the network access server to the service request switch;

instructions monitoring any used associated channel and waiting until the used associated channel becomes substantially unused, said monitoring being for either of a digital and an analog call as indicated by defined digital and analog signaling protocols comprehended by said monitoring instructions, and migrating selected ones of existing calls to other networks access servers without disconnection to the end user;

instructions, operative when the used associated channel becomes substantially unused as indicated by such defined digital and analog signaling protocols comprehended by said monitoring instructions, communicating a busy condition of such then-unused channel from the network access server to the service request switch;

instructions signaling the network access server that maintenance can be performed; and instructions automatically routing any new client service requests that may arrive during a busy condition of the network access server to another network access server operatively coupled with the service request switch and within the given hunt group, said communicating, said monitoring-and-waiting, said communicating, said signaling and said routing instructions being executed selectively upon a determination that off-line maintenance is needed.

16. A computer-readable medium containing a program for temporarily taking offline for service a given network access server within a given hunt group, the given network access server having plural associated channels, the given network access server being operatively coupled with a network service request switch, the program comprising:

instructions busying out any substantially unused channels of the given network access server and communicating a busy condition thereof to the service request switch; instructions monitoring any used associated channel, wherein busying out includes migrating existing calls having a usage threshold below a predetermined threshold to other access servers;

instructions awaiting termination of substantial use of any remaining associated channels of the given network access server and thereafter communicating a busy condition thereof to the service request switch;

instructions signaling that service to the given network access server can be performed;

instructions automatically routing any new client service requests that may arrive during a busy condition of the given network access server to another network access server operatively coupled with the service request switch and within the given hunt group; and instructions communicating a substantially idle condition of the associated channels to the service request switch, said communicating instructions being executed selectively upon a determination that such service has been completed.

* * * * *